(12) United States Patent
Hargabus

(10) Patent No.: US 7,589,287 B1
(45) Date of Patent: Sep. 15, 2009

(54) PORTABLE MEMORY SCALE WITH INTERCHANGEABLE TOOL CARRIER

(76) Inventor: Patrick Allen Hargabus, 816 Locklear Ave., Sarasota, FL (US) 34237-8320

( * ) Notice: Subject to any disclaimer, the term of this patent is extended or adjusted under 35 U.S.C. 154(b) by 0 days.

(21) Appl. No.: 12/024,449

(22) Filed: Feb. 1, 2008

(51) Int. Cl.
*G01G 19/40* (2006.01)

(52) U.S. Cl. ............... 177/25.13; 177/25.17; 177/25.19; 177/148; 177/245

(58) Field of Classification Search ............. 177/25.13, 177/25.17, 25.19, 131, 148–149, 245
See application file for complete search history.

(56) References Cited

U.S. PATENT DOCUMENTS

| | | | | |
|---|---|---|---|---|
| 3,863,724 | A * | 2/1975 | Dalia, Jr. ................. | 177/25.19 |
| 4,108,363 | A * | 8/1978 | Susumu ..................... | 235/383 |
| 5,014,798 | A * | 5/1991 | Glynn ...................... | 177/25.19 |
| 5,307,250 | A * | 4/1994 | Pearson ..................... | 362/101 |
| 5,608,193 | A * | 3/1997 | Almogaibil ............... | 177/25.13 |
| 5,671,362 | A * | 9/1997 | Cowe et al. ................... | 705/28 |
| 5,819,901 | A * | 10/1998 | Filiberti ..................... | 194/202 |
| 5,900,592 | A * | 5/1999 | Sohns et al. ............. | 177/210 R |
| 6,590,166 | B2 * | 7/2003 | Yoshida .................... | 177/25.13 |
| 7,202,780 | B2 * | 4/2007 | Teller .................... | 340/539.31 |
| 7,370,730 | B2 * | 5/2008 | Johnson et al. ............... | 186/59 |

* cited by examiner

*Primary Examiner*—Randy W Gibson
(74) *Attorney, Agent, or Firm*—Dorothy S. Morse

(57) ABSTRACT

A carrier of loose items that a user can employ with a quick glance to determine whether the weight balance displayed on a screen indicates carried items in greater, lesser, or equivalent quantity than previously recorded. A physical inventory of carried items is avoided when the display screen shows a zero weight measurement. However, a non-zero display screen measurement provides time-saving information about the size of items missing or acquired. The carrier's upper portion, which detaches from a memory scale, is readily exchanged with other carriers of differing size and shape. Audible signaling means informs the user at the time the carrier/scale combination is lifted from a support surface if any items are missing or have been inadvertently acquired, to prevent a user from leaving or acquiring valuable tools/items. Other applications include, but are not limited to, transporting supplies relating to fishing, jewelry making, crafts, gardening, and the medical field.

20 Claims, 3 Drawing Sheets

PORTABLE MEMORY SCALE WITH INTERCHANGEABLE TOOL CARRIER

CROSS-REFERENCES TO RELATED APPLICATIONS

None.

BACKGROUND

1. Field of the Invention

This invention generally relates to devices used to transport other items to and from a work site, specifically to a tool caddy, tool box, tool bag, tote, or other carrier that is attachable to the tray on a memory scale through which a user can determine with only a quick glance at the scale's display screen whether all of the tools and/or other items previously held by the carrier are all accounted for. When arriving at a work site, its user simply activates the sturdy but lightweight memory scale secured under the carrier so that the scale treats the weight of the caddy, tool box, tool bag, tote, or other carrier, and all of the items carried by it, as a tare weight and produces a zero on its display screen. Then, when the user is ready to leave the work site and the user believes that all items brought to the work site have been replaced in the carrier, the user again looks at the display screen for verification. If the display screen still reads zero, then no item is missing and the user can leave the work site without needing to conduct a time-consuming inventory of items in the carrier to prevent loss of expensive tools, parts, or other items. In the alternative, should the display screen show a positive weight, the user would know that an item was inadvertently acquired, and the user could make an attempt to find the added item and remove it from the carrier. Should a replacement part be removed during work progress and used for a repair, the user simply would activate the scale to recalculate the tare weight without the used item, so that a zero is again produced on the display screen. At the time of departure from the work site, the user would then know if all of the remaining items are on board by the presence of a zero on the display screen. The absence of a zero weight measurement would indicate either the acquisition or loss of items, with the weight of such items shown as a measurement in pounds, ounces, or metric units. Thus, a user only has to remember one number, a zero, instead of differing weights that would result each time the carrier contained a different assortment of items. Further, the identification of weight on the display screen gives the user time-saving information about the approximate size of the item or items to look for and retrieve (or potentially remove), before moving the carrier and its attached memory scale to a new location. The carrier used with the invention for one application can be interchangeable with carriers that are larger, smaller, and/or differently shaped for user convenience in transporting a wide variety of tools and other items in differing applications. Also, the display screen is removable from its usual location and able to be re-affixed to another surface, so that it can be placed where it is readily seen when an oversized carrier is used. Further, audible signaling means are associated with the invention to let the user know something previously carried by the caddy, tool box, tool bag, tote, or other carrier is missing should the user fail to view the display screen before lifting the present invention for transport to a different location. The tray secured between the carrier and the scale may be similarly used without the carrier to hold items being transported to and from a work site without the user having to worry about leaving carried items behind, or acquiring unneeded items, when moving to a new location. In addition to the transport of tools and repair parts, other applications of the present invention may include, but are not limited to, transport of items relating to fishing, jewelry making, medical supplies, and crafts to prevent inventories of such items from becoming prematurely diminished due to inadvertent misplacement. The terms caddy, tool box, tool bag, and tote will all be in the ensuing description to describe the carrier portion of the present invention secured upon the upper surface of a tray in contact with the scale, and it is intended that the definition of each carrier portion identifying word should be broadly interpreted, unless otherwise specifically noted.

2. Description of the Related Art

When completing installations and repairs, workers can easily become distracted by unexpected problems and/or other activity occurring around them. Also, installations and repairs often require the use of multiple tools, repair parts, fasteners, connectors, tape, marking instruments, and/or other items. Particularly when problems are encountered early on in a work project and the worker must employ a variety of tools to overcome them, one or more of the tools or unused repair parts may become scattered about the work site instead of being immediately replaced in the tool caddy, tool box, tool bag, tote, or other carrier. Then, when the repair or installation is complete, the worker can be distracted by thoughts of the next work project, mealtime, or other activity and leave one or more of the scattered items behind. Millions of dollars are lost each year due to misplaced and/or forgotten hand tools and other items which collectively can prove expensive to a worker and significantly increase his or her cost of doing business. The present invention alerts a worker leaving a work site when a tool or other item is missing from the tool caddy, tool box, tool bag, tray, tote, or other carrier, thus, overcoming this common problem. Although scales are known to have an upper tray used to hold items to be measured, they are not typically designed for frequent transport from one location to another. Further, none is known to have a motion sensor that audibly alerts a user when it is lifted without a tare weight of zero remaining on the display screen.

One of the inventions thought to be most closely related to the present invention is that disclosed as a tote bin scale on the Internet website of publicworks.com under the heading of Product Showcase. It has a rugged design for frequent on and off loading, as well as accurate weighing of off-center loads. The illustration on the web page shows an open-frame basket atop the weighing platform. The other invention thought to be closely related to the present invention is the common top-loading kitchen scale used for measuring the weight of food items. However, the present invention is distinguishable from both of these devices because its upper carrier used to hold items to be weighed is detachable from its lower memory scale, the scale is transported from one location to another with the removable carrier, and audible signaling means is provided to alert a user that the weight of the carrier at its time of departure is different from its recorded weight stored in memory. Although many prior art tool caddies, totes, tool bags, tool boxes, and top-loading scales exist, none of them measures the weight of its contents to keep track of whether items originally on board have been replaced by a substitute item or are no longer present, or alerts a user when additional items not previously present are suddenly and inadvertently acquired. No other apparatus or method is known that has the same structure, functions in the same manner, or provides all of the advantages of the present invention.

BRIEF SUMMARY OF THE INVENTION

It is the primary object of this invention to provide a tool caddy, tool box, tool bag, tote, or other carrier with attached portable memory scale that prevents workers from leaving forgotten hand tools and/or other items behind at a work site. A further object of this invention is to provide a tool caddy, tool box, tool bag, tote, or other carrier with attached portable memory scale, and for the scale to have a tray and fastening means for attachment of the carrier to the scale, wherein the tray is constructed for independent use to achieve the same loss prevention purpose. It is also an object of this invention to provide a tool caddy, tool box, tool bag, tote, or other carrier with easily read and immediately identifiable visual information about whether all of the items originally therein are all present and accounted for. A further object of this invention is to provide a tool caddy, tool box, tool bag, tote, or other carrier with audible signaling means that alerts a user to missing and/or acquired items should the carrier be lifted from a support surface with less or more than a zero weight measurement. It is also an object of this invention to provide a tool caddy, tool box, tool bag, tote, or other carrier with a lightweight portable memory scale attached to it. It is a further object of this invention to provide a tool caddy, tool box, tool bag, tote, or other carrier with a memory scale having durable construction for long term accurate use and a minimum weighing capability of at least ten to twenty pounds. It is also an object of this invention to provide a tool caddy, tool box, tool bag, tote, or other carrier with a portable memory scale capable of measuring small weight differences, such as one-quarter ounce. It is a further object of this invention to provide a tool caddy, tool box, tool bag, tote, or other carrier with an easily zeroed (tared) memory scale.

The present invention, when properly made and used, will provide a lightweight tool caddy, tool box, tool bag, tote, or other carrier attachable to a portable memory scale that alerts its user to the fact that a tool or other item, or items, are missing from it so that the user does not leave those items behind when the carrier is transported to a new location. Although the memory scale travels with the carrier, it is contemplated for the carrier used to be removable from the memory scale and exchanged for another of differing internal volume, different number of external pockets, and/or different organizational capability for carried items, as needed to enhance present invention diversity and convenience in differing applications. The portable memory scale used in the present invention should have lightweight and durable construction, and be able to measure small weight differences, such as one-quarter ounce. Further, its display screen should be sufficiently large with numbers that are easily read for easy user viewing. The display screen is also preferably movable from its preferred position so that when a much larger carrier is attached to the portable memory scale and obscures any part of the display screen, the display screen can be repositioned to again become readily visible for easy user viewing. The portable memory scale should also be easily reset to zero (so as to obtain a tare weight), preferably requiring a single engagement of one button, toggle, or other control. It is also contemplated for the most preferred memory scale to have a small height dimension and further have a wide stance for stable support of an attached carrier. In addition, the preferred means of attaching the caddy, tool box, tool bag, tote, or other carrier to the portable memory scale tray is the use of several heavy duty hook-and-loop fasteners, or at least one easily fastened and released strap which securely encircles the tray and carrier to bind them together. The memory scale of the present invention uses battery power so that it remains easily portable, and it incorporates a motion sensor on its bottom surface that activates a buzzer or other audible attention-attracting alarm when the carrier is lifted with the memory scale from a support surface while carrying less or more weight than most recently measured the last time its was re-zeroed (tared). It is also preferred, but not critical, for the memory scale used as a part of the present invention to have a scratch-resistant bottom surface and/or resilient foot pads. Further, although a 35-70 pound weighing capacity is preferred for the present invention memory scale, such weight range is not critical. It is also preferred for the present invention memory scale to measure weight alternatively in metric units or pounds and ounces.

The description herein provides preferred embodiments of the present invention but should not be construed as limiting its scope. For example, variations in the number, type, and locations of fasteners used to secure the caddy, tool box, tool bag, tote, or other carrier to the portable memory scale; the size and perimeter configuration of the display screen; the type and location of the motion sensing means; the size and configuration of the foot pads used, if any; the size, shape, and location of the battery compartment; and the size and positioning of control buttons, other than those shown and described herein, may be incorporated into the present invention. Thus, the scope of the present invention should be determined by the appended claims and their legal equivalents, rather than being limited to the examples given.

LIST OF COMPONENTS

1—tool caddy
2—hook-and-loop fastener
3—platform tray
4—memory scale housing
5—display housing
6—magnetic mounting connectors
7—scale-to-display cable assembly
8—weight converter button
9—backlight illumination button
10—display screen
11—sensor alarm
12—zero reset button (tare button)
13—power button
14—battery compartment
15—bottom surface of memory scale housing
16—resilient foot pads
17—motion sensing means or motion detector
18—battery compartment cover
19—weight capacity indicator
20—low battery indicator

DETAILED DESCRIPTION OF PREFERRED EMBODIMENTS

Figure 1:
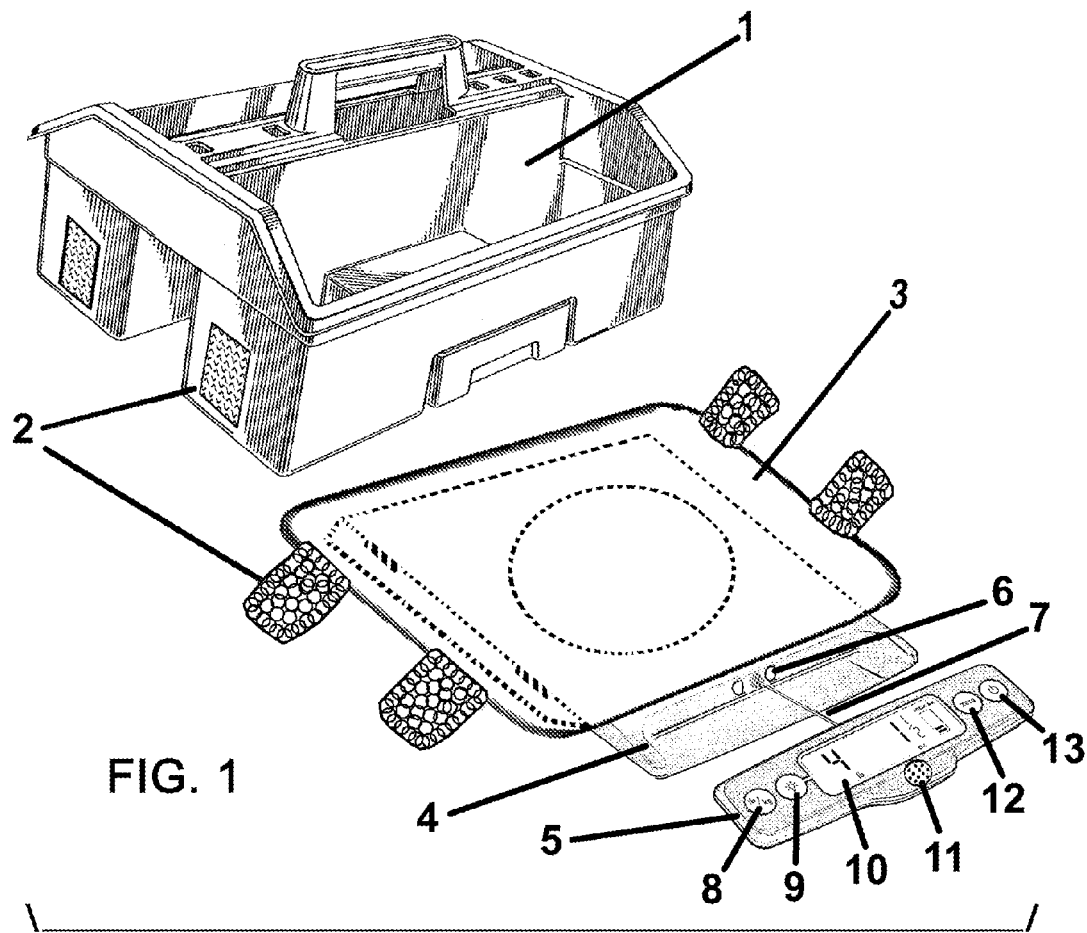
FIG. 1 is an exploded view of the most preferred embodiment of the present invention having a memory scale with a removable display housing having a readily visible display screen, with a tool caddy configured for secure connection to a tray attached to the memory scale so that it can be lifted with the tool caddy during its transport from one location to another, the display housing being attached to the memory scale via magnetic connectors and a cable assembly.
Figure 2:
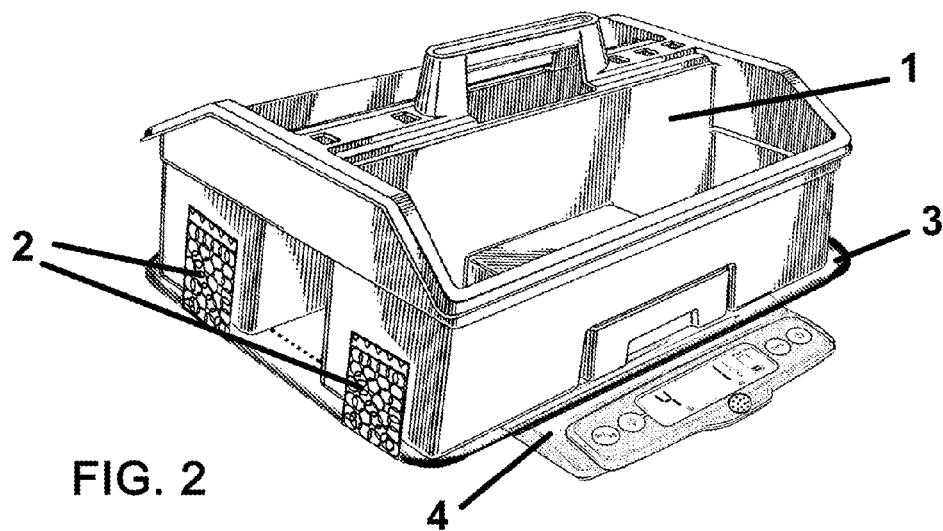
FIG. 2 is a perspective view of the most preferred embodiment of the present invention tool caddy securely connected upon the tray above the memory scale and the display housing in its preferred position of use.
Figure 3:
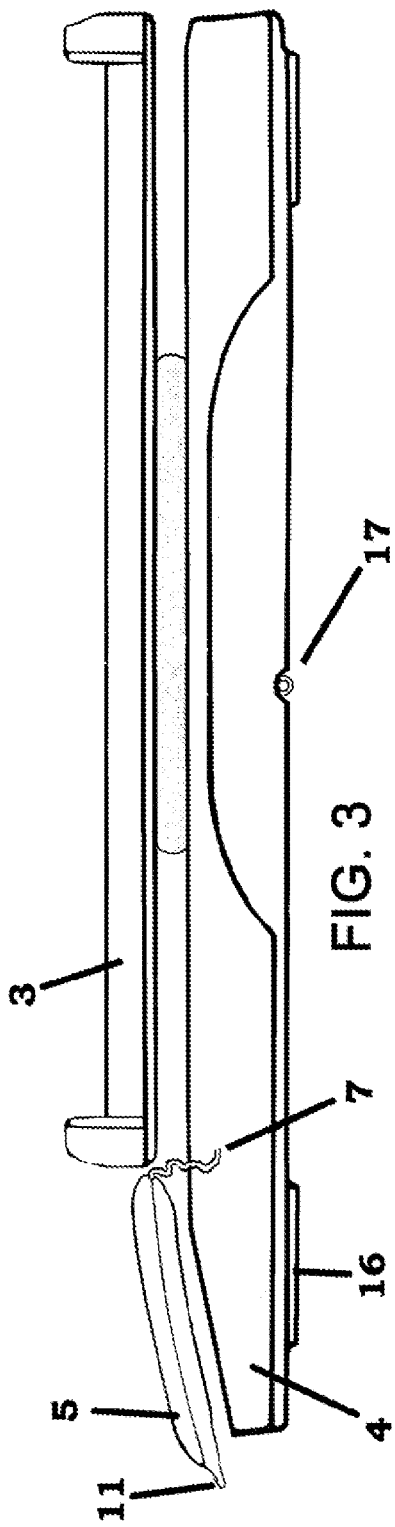
FIG. 3 is a side view of the most preferred embodiment of the present invention without a tool caddy or other carrier connected to the tray above the memory scale and including a motion detector, multiple foot pads, and a cable connecting the display housing to the memory scale.
Figure 4:
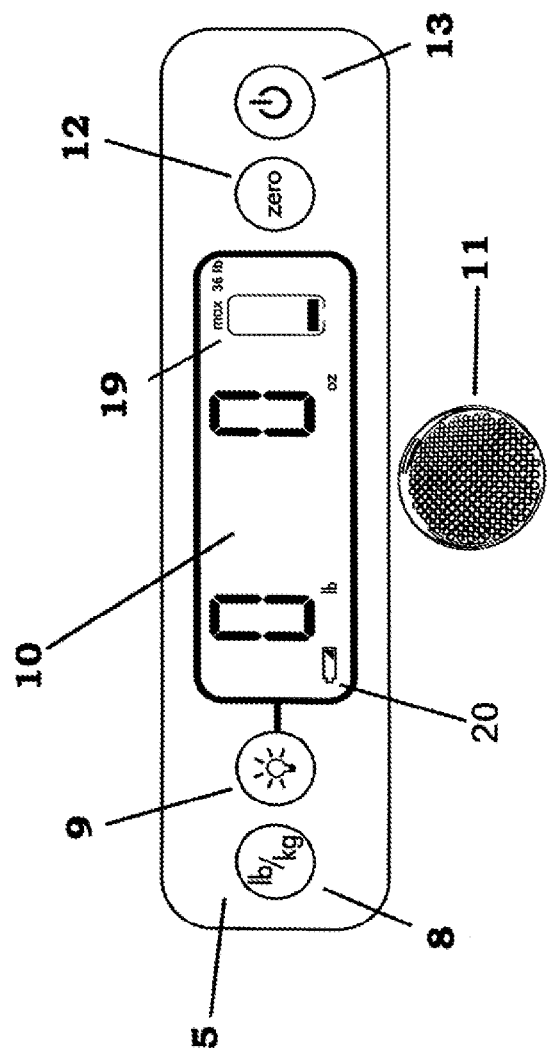
FIG. 4 is a front view of a preferred embodiment of display housing in the present invention and the preferred location of motion sensor alarm on the memory scale relative to the display housing, with the display housing having a power button, an auto-zero control (tare button), a weight capacity indicator, a low battery indicator, numerical markings, a weight converter control, and a control for display screen backlight illumination for enhanced viewing in dimly lit surroundings.
Figure 5:
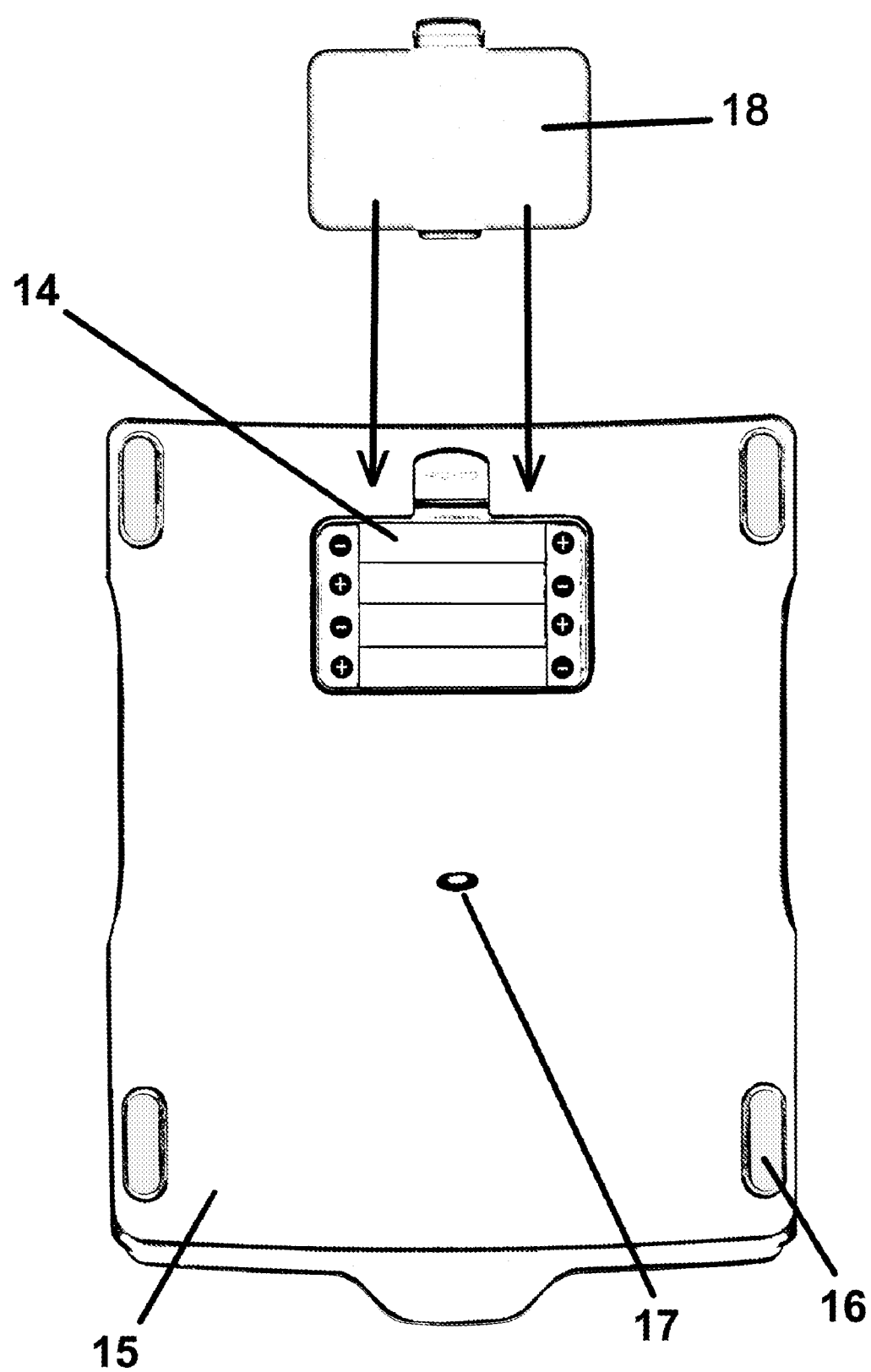
FIG. 5 is a bottom view of a preferred embodiment of memory scale housing in the present invention having a bottom surface with a battery compartment, a removable cover for the battery compartment, a centrally located motion sensor, and scratch-resisting foot pads located adjacent to each corner.

The present invention provides a lightweight tool caddy, tool box, tool bag, tote, or other carrier 1 having an attached portable memory scale 4 that alerts its user to the fact that a tool or other item (not shown), or possibly multiple tools or items, are missing from or added to it so that the user does not either leave those items behind, or accidentally take/acquire any items from the work site when carrier 1 is transported to a new location. For both clarity and brevity in the ensuing description, the term 'carrier 1' will be used as a collective term to mean caddy, tool box, tool bag, tote, or other carrier, unless otherwise specifically mentioned. It is contemplated for carrier 1 to be removable from the portable memory scale housing 4 and exchanged for another (not shown) of differing internal volume, different number of external pockets, and/or different organizational capability for carried items for enhanced diversity and user convenience in differing applications. In fact, although not shown, users having a favorite tool bag or carrier could modify their favorite bag with hook-and-loop fasteners 2 or use strapping means to secure it to memory scale housing 4 and/or tray 3. The memory scale housing 4 used should have lightweight and durable construction, and the measurement capability of memory scale 4 should be able to measure small weight differences, such as one-quarter ounce. Further, its display screen 10 should be sufficiently large with numbers that are easily read by a user. The display housing 5 that contains display screen 10 is also preferably movable from its preferred position upon memory scale housing 4, so that when a very large tote or caddy 1 is attached to the portable memory scale and obscures the display screen 10, it can be easily repositioned to again become readily visible for prompt viewing. Repositioning can be accomplished by securing display housing 5 directly on a portion of carrier 1, or by simply using the cable assembly 7 connected to display housing 5 to pull out display housing 5 and distance it from portable memory scale 4 and any oversized carrier 1. The portable memory scale 4 should also be easily reset to zero (tared), preferably requiring a single engagement of one zero reset button 12 or other control. In addition to having sturdy construction, it is also preferred for the memory scale 4 to be thin and have a wide stance for stable support of the attached caddy, tool box, tool bag, tote, or other carrier 1. Also, the preferred means of attaching carrier 1 to the tray 3 above portable memory scale 4 is the use of heavy duty hook-and-loop fasteners 2. However, in the alternative although not shown, one or more straps may be used, or a combination of hook-and-loop fasteners 2 and straps. The portable memory scale 4 of the present invention uses battery power and incorporates motion sensing means 17 on its bottom surface 15 that activates a buzzer or other audible alarm 11 when carrier 1 is lifted from a support surface with less or more weight than most recently measured the last time it was re-zeroed. It is also preferred, but not critical, for the portable memory scale 4 to have a scratch-resistant bottom surface 15 and/or resilient foot pads 16. Further, although a thirty-five to seventy pound weighing capability can be used for the present invention, such weight range is not critical. It is also preferred for weight to be measured alternatively in metric units or pounds and ounces. FIGS. 1 and 2 show the present invention with a tool caddy, tool box, tool bag, tote, or other carrier 1, while in FIG. 3 only the tray 3 is present. FIG. 4 shows an enlarged view of the display screen 10 seen in FIGS. 1 and 2, while FIG. 5 shows the bottom surface 15 of memory scale housing 4 having foot pads 16 and a battery compartment 14 with a removable cover 18.

FIG. 1 is an exploded view of the most preferred embodiment of the present invention having a tool caddy/carrier 1 and a portable memory scale 4 that is configured and made of durable construction so that it can be repeatedly lifted with carrier 1 during its transport to new locations. Removably associated with portable memory scale 4 is a display housing 5 with a readily visible display screen 10. The capability for display housing 5 to be removable is preferred, so that it can be remounted in a different location as needed to accommodate the use of a carrier 1 larger than the tool caddy/carrier 1 shown in FIG. 1 and thereby maintain ready visibility of display screen 10. Although magnet mounting connectors 6 are shown in FIG. 1 for securing display housing 5 in its preferred position of use against memory scale housing 4, other fastening means can be used, including but not limited to easily releasable hook-and-loop fasteners (not shown in such a capacity), or a combination of fastening means can be used. FIG. 1 also shows display housing 5 having several controls and/or other features in association with display screen 10, to include a scale-to-display cable assembly 7, a power button 13, a zero re-set button 12 (or tare-functioning button), a sensor alarm 11, a backlight illumination button 19 for display screen 10, and a weight conversion button 8. The locations of these controls and/or other features are not critical and not considered limited to that shown in FIG. 1. In addition, FIG. 1 shows a platform tray 3 that is FIG. 3 is shown to have an upturned perimeter edge (not separately numbered). FIG. 1 further shows several hook-and-loop fasteners 2 used to secure caddy/carrier 1 to tray 3, thereby allowing portable memory scale 4 to accompany and travel with caddy/carrier 1 when caddy/carrier 1 is picked up by a user and removed from a support surface. The outline of a substantial portion of portable memory scale 4, which is hidden under platform tray 3, is shown in FIG. 1 in broken lines. The attachment of tray 3 to portable memory scale 4 must be sufficiently strong to permit portable memory scale 4 to remain attached thereto when tray 3 and/or a carrier 1 is picked up by a user. Welding, adhesive, or bonding means may be used, although not limited thereto. The shape and size of the carrier 1 used in the present invention is not limited to that shown in FIG. 1. In addition, the shapes and sizes of the platform tray 3 and portable memory scale 4 used in the present invention are not limited to that shown in FIG. 1, except that it is preferred for portable memory scale 4 to be thin and have a wide stance for enhanced stability of carrier 1 during its use. Also, the relative sizes of carrier 1, platform tray 3, and portable memory scale 4 can be different from that shown in FIG. 1. In addition, the number, size, perimeter configuration, thickness, and location of attachment of hook-and-loop fasteners 2 can be different from that shown in FIG. 1. FIG. 2 shows carrier 1 in the most preferred embodiment of the present invention positioned upon platform tray 3 and secured to it with multiple hook-and-loop fasteners 2. In addition, FIG. 2 shows display housing 5 in its preferred position of use where display screen 10 is readily visible to a user for confirming whether the departing weight of carrier 1 is the same, more, or less that that last recorded.

FIG. 3 is a side view of the most preferred embodiment of the present invention and shows no carrier 1 upon platform tray 3, which upwardly depends from portable memory scale housing 4. Display housing 5 is positioned above a front portion of scale housing 4 and connected to it via scale-to-display cable assembly 7. The connection of display housing 5 to scale housing 4 via magnetic mounting connectors 6 and/or optional hook-and-loop fasteners is not shown in FIG. 3. The number 11 in FIG. 3 adjacent to display housing 5 identifies a sensor alarm that is in communication with the motion sensing means 17 identified centrally in association with the bottom surface 15 of portable memory scale housing 4. Should a user fail to view display screen 10 and pick up carrier 1 (with memory scale housing 4 attached), or pick up portable memory scale housing 4 when carrier 1 is not present, and thereby fail to notice a non-zero weight measurement on display screen 10, motion sensing means 17 will activate sensor alarm 11 to provide an audible reminder to the user that at least one tool or other item is missing or acquired. The user can then perform an inventory of items held by the carrier 1 or platform tray 3 in an attempt to identify the missing or acquired item or items. Thus, a time-consuming inventory of carrier 1 or platform tray 3 is only needed when the display screen 10 does not produce a zero weight measurement and instead shows a positive or negative weight measurement difference from the user's last recorded tare action. Therefore, in addition to a time-saving benefit, the present invention also provides a cost-saving benefit by preventing a user from accidentally leaving behind expensive tools, repair parts, and other items when leaving a work site. FIG. 3 also shows multiple foot pads 16 secured to the bottom surface of portable memory scale housing 4. In the alternative or in combination, portable memory scale housing 4 may optionally have resilient foot pads 16 or a non-scratch bottom surface so that it can be used without risk of damage on a wide variety of support surfaces. The number, shape, dimension, location, and material from which foot pads 16 are made may vary and be different from that shown in FIG. 3.

FIG. 4 is a front view of the most preferred embodiment of display housing 5 in the present invention and a preferred positioning of sensor alarm 11 relative to it. The portable memory scale housing 4 to which both are attached is not shown in FIG. 4. Display screen 10 is shown centered on display housing 5, although this is not critical. It is preferred for display screen 10 to have large numerical markings, such as the two zeros shown. Also, although not critical, it is also preferred for display screen 10 to have a low battery indicator 20 and a weight capacity indicator 19 for user convenience. While the positioning of low battery indicator 20 and weight capacity indicator 19 should not distract from the viewing of a displayed tare weight or weight measurement balance, neither is limited to the positioning shown in FIG. 4. The other controls shown in association with display housing 5 in FIG. 4 are a power control 13, a zero reset button 12 (also could be referred to as a tare control), a backlight illumination control 9 for display screen 10 when it is located in dimly lit surroundings, and a weight converter control 8 so that weight measurements can be viewed in pounds and ounces or metric units according to user preference. However, the sizes, configurations, locations, space-apart distances, and identifying markings shown in FIG. 4 for each of these features should not be considered as limiting. Although not shown, a clock in digital or non-digital form could also be incorporated as a part of display housing 5.

FIG. 5 is a bottom view of the most preferred embodiment of portable memory scale housing 4 in the present invention. A motion detector or motion sensing means 17 is shown in a central position on bottom surface 15. The central positioning is not critical. Also, a battery compartment 14 and removable cover 18 are revealed. The shape, size, location of battery compartment 14 relative to the perimeter edge of bottom surface 15 are not critical, nor is type of battery used as long as sufficient power is generated for cost effective and efficient use. Depending upon the number of times backlit illumination is employed by a user to view display screen 10 and whether a clock (not shown) is associated with display housing 5, it is contemplated that a 9-volt battery could last 6-months or more before replacement battery power is required. Although four foot pads 16 are shown associated with bottom surface 15, with locations of each adjacent to a different one of the corners of portable memory scale housing 4 the number of foot pads 16 used is not limited to that shown in FIG. 5. Further, the corner positioning of foot pads 16 is preferred to provide a wide stance for enhanced stability of portable memory scale housing 4 and any carrier 1 used with it, however, the positioning shown in FIG. 5 is not the only contemplated positioning for foot pads 16. Thus, the positioning of foot pads 16 shown in FIG. 5 should not be considered as limiting.

Use of the present invention is time saving and provides a cost benefit. A user of the present invention can determine with only a quick glance at the display screen 10 on memory scale housing 4 whether all of the tools and/or other items (not shown) previously held or carried by the caddy 1, tool box, tool bag, tote, or other carrier are all accounted for, so none become inadvertently lost. When arriving at a work site, its user simply activates the lightweight portable memory scale 4 secured under the carrier 1 so that memory scale 4 treats the weight of carrier 1 and all of the items carried by it as a tare weight, and produces a zero weight measurement on its display screen 10. Then, when the user is ready to leave the work site and the user believes that all items brought to the work site have been replaced in carrier 1, the user again looks at display screen 10 for verification. If display screen 10 still reads zero, then no item is missing and the user can leave the work site without needing to conduct a time-consuming inventory of items in carrier 1 to prevent loss of expensive tools, parts, or other items. In the alternative, should display screen 10 show a positive weight gain, the user would know that an item was inadvertently acquired, and the user could make an attempt to find the added item and determine its appropriate location. Since it is preferred for portable memory scale 4 to measure weight differences at least as low as one-quarter ounce, it is unlikely that the weights of a missing item and an acquired item would have identical weights and produce a zero net weight, even though this is within the realm of possibility. Should a replacement part be removed during work progress and used for a repair, the user simply would activate portable memory scale 4 to recalculate the tare weight without the used item, so that a zero is again produced on display screen 10. At the time of departure from the work site, the user would then know if all of the remaining items are on board by the presence of a zero weight measurement on display screen 10. The lack of a zero would indicate the acquisition or loss of at least one item, with the weight of such items shown as a measurement in pounds, ounces, or metric units according to user preference. Thus, a user only has to remember one number, a zero, instead of differing weights that would result each time carrier 1 contained a different assortment of items. Further, the identification of weight on display screen 10 gives the user time-saving information about the approximate size of the item or items to look for and retrieve (or potentially remove), before moving the combination of carrier 1 and memory scale 4 from its current location. The carrier 1 (caddy, tool box, tool bag, tote, or other carrier) of the invention can be interchangeable with carriers that are larger, smaller, and/or differently shaped for user convenience in transporting a wide variety of tools and other items in differing applications. Also, display housing 5 is preferably removable from its usual location so that it can be placed where it is readily seen when an oversized carrier 1 is secured to platform tray 3. Further, audible signaling means 11 are associated with the invention to let the user know something previously held by carrier 1 is missing should the user fail to view display screen 10 before lifting the present invention for transport to a different location. The platform tray 3 secured between carrier 1 and the portable memory scale 4 may be similarly used without the carrier 1 to transport items to and from a work site without the user having to worry about leaving carried items behind when moving memory scale 4 and tray 3 to a new location. In addition the carried items prevented by use of the present invention from becoming prematurely lost or inadvertently misplaced can include tools and repair parts, as well as other items such as those relating to fishing, jewelry making, medical supplies, and crafts. Another advantage of using the present invention in fishing applications is that carrier 1 can be quickly and easily removed from tray 3 so that tray 3 can be used for accurate weighing of fish.

What is claimed is:

1. A portable hand-carried device that alerts its user when items previously carried on board are no longer present and when acquired items have been added, said device comprising:
 a memory scale having a housing with an upper surface, a readily visible display screen, and a zero reset capability;
 a substantially horizontally-extending tray associated with said upper surface;
 a carrier selected from a group consisting of tool caddies, tool boxes, bags, and totes, and wherein said carrier is configured for being supported by said upper surface of said tray;
 fastening means adapted for securing said carrier to said tray; and
 signaling means associated with said memory scale that is configured for alerting a user when said device is lifted from a support surface and said display screen shows any weight measurement other than zero, thereby indicating at least one of the following, at least one previously carried item missing from said tray, at least one previously carried item missing from said carrier, at least one acquired item added to said tray, and at least one acquired item added to said carrier.

2. The device of claim 1 wherein said zero reset capability of said memory scale is adapted for a one button, single engagement operation.

3. The device of claim 1 wherein said memory scale has a bottom surface with a plurality of foot pads associated therewith.

4. The device of claim 3 wherein said foot pads are made from scratch-resistant material.

5. The device of claim 1 wherein said memory scale has a bottom surface and said signaling means comprises a motion detector associated with said bottom surface.

6. The device of claim 5 wherein said signaling means further comprises an audible alarm.

7. The device of claim 1 wherein said memory scale has wide stance configured for enhanced stability of said tray, and enhanced stability of said carrier when positioned upon said tray.

8. The device of claim 1 wherein said memory scale further comprises controls and indicators selected from a group consisting of controls for backlit illumination of display screens, controls for alternate display screen viewing of weight in differing units, on-off controls, maximum weight capacity indicators, low power indicators, and controls adapted for single engagement zero reset.

9. The device of claim 1 wherein said display screen is part of a movable display housing that is configured to be removed from said memory scale housing and secured in other visibility-enhancing locations.

10. The device of claim 9 wherein said display housing is secured to said memory scale housing via attachment means selected from a group consisting of hook-and-loop fasteners, magnetic mounting connectors, and cable assemblies.

11. The device of claim 1 wherein said memory scale is configured to operate on battery power.

12. The device of claim 1 wherein said tray has an up-turned perimeter configuration.

13. A method of making the portable hand-carried device of claim 1, said method comprising the steps of:
 providing the memory scale, signaling means, and tray in claim 1;
 associating said signaling means with said memory scale so that when memory scale is moved from a location without a zero weight measurement upon said display screen, an attention-attracting signal is generated; and
 associating said a tray with said upper surface of said memory scale so that a user is made aware when items previously on said tray are no longer present and when acquired items have been added to said tray.

14. The method of claim 13 wherein said two steps of associating are reversed in order.

15. The method of claim 13 further comprising the step of providing a carrier selected from a group consisting of tool caddies, tool boxes, bags, and totes, wherein said carrier is configured for being supported by said upper surface of said tray, and further comprising the step of associating said carrier with said tray for support of said carrier by said tray.

16. The method of claim 13 further comprising the steps of providing fastening means adapted for securing said carrier to said tray and using said fastening means to secure said carrier to said tray.

17. The method of claim 13 wherein said display screen is part of a movable display housing that is configured to be removed from said memory scale housing and secured in other visibility-enhancing locations.

18. The method of claim 13 wherein said signaling means comprises at least one motion detector and at least one audible alarm.

19. The device of claim 1 wherein said memory scale has a bottom surface and scratch-resistant foot pads associated with said bottom surface, said signaling means comprises a motion detector associated with said bottom surface, and said signaling means further comprises an audible alarm.

20. The method of claim 16 wherein said memory scale further comprises controls and indicators selected from a group consisting of controls for backlit illumination of display screens, controls for alternate display screen viewing of weight in differing units, on-off controls, maximum weight capacity indicators, low power indicators, and controls adapted for single engagement zero reset.

* * * * *